(12) United States Patent
King

(10) Patent No.: US 6,567,513 B2
(45) Date of Patent: *May 20, 2003

(54) DRIVE AND METHOD FOR TRANSFERRING UNBUNDLED NETWORK ELEMENTS BETWEEN LOCAL EXCHANGE CARRIERS

(75) Inventor: Royce D. King, Austin, TX (US)

(73) Assignee: SBC Technology Resources, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/901,111

(22) Filed: Jul. 10, 2001

(65) Prior Publication Data
US 2001/0040956 A1 Nov. 15, 2001

Related U.S. Application Data

(63) Continuation of application No. 09/056,769, filed on Apr. 8, 1998.

(51) Int. Cl.$^7$ .......................... H04M 7/00; H04M 3/00; H04M 5/00
(52) U.S. Cl. .................... 379/221.02; 379/327
(58) Field of Search .................... 379/219, 220.01, 379/221.01–221.15, 327

(56) References Cited

U.S. PATENT DOCUMENTS

| | | | |
|---|---|---|---|
| 4,565,903 A | 1/1986 | Riley | 379/211.02 |
| 4,866,763 A | 9/1989 | Cooper et al. | 379/221.02 |
| 5,553,129 A | 9/1996 | Partridge, III | 379/114.02 |
| 5,602,909 A | 2/1997 | Carkner et al. | 370/385 |
| 5,619,562 A | 4/1997 | Maurer et al. | 379/201.05 |
| 5,661,789 A | 8/1997 | Boyle et al. | 379/207.02 |
| 5,732,131 A | 3/1998 | Nimmagadda et al. | 379/221.02 |
| 5,809,120 A | 9/1998 | Montgomery et al. | 379/114.06 |
| 5,854,835 A | 12/1998 | Montgomery et al. | 379/112.01 |
| 5,867,570 A | 2/1999 | Bargout et al. | 379/211.02 |
| 5,883,948 A | 3/1999 | Dunn | 379/14 |
| 5,903,639 A | 5/1999 | Lipchock et al. | 379/221.08 |
| 5,970,130 A | 10/1999 | Katko | 370/352 |
| 5,995,609 A | 11/1999 | Melnyk et al. | 379/221.13 |
| 6,035,028 A | 3/2000 | Ward et al. | 370/395.71 |
| 6,035,029 A | 3/2000 | Little et al. | 379/201.01 |
| 6,038,227 A | 3/2000 | Farris et al. | 370/354 |
| 6,317,493 B1 * | 11/2001 | Little et al. | 379/207.04 |
| 2002/0101972 A1 * | 8/2002 | Teixeira | 379/221.01 |

* cited by examiner

Primary Examiner—Benny Q. Tieu
(74) Attorney, Agent, or Firm—Greenblum & Bernstein, P.L.C.

(57) ABSTRACT

The present invention is directed to a device and method for transferring service of a local loop from one local exchange carrier to another competing local exchange carrier. A first local exchange carrier has a first switch connected to an distribution frame, which is connected to subscribers. A second local exchange carrier sets up a second switch and an interface in proximity to the distribution frame, and "half-taps" the interface with the connection between the first switch and the distribution frame. The second local exchange carrier has control over the first switch to connect or disconnect it from the distribution network.

18 Claims, 4 Drawing Sheets

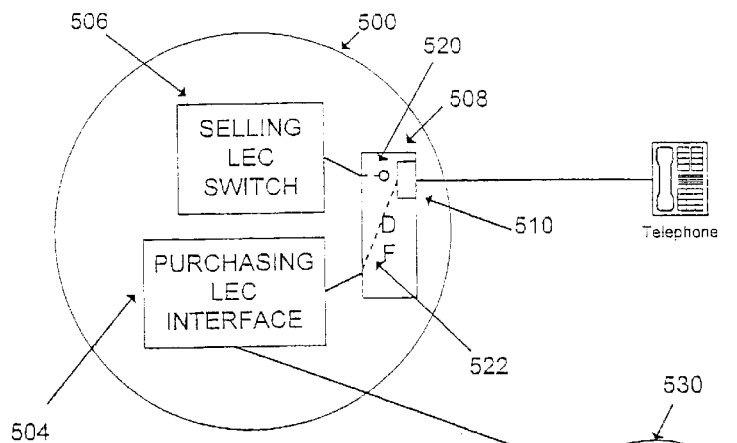
Fig. 3
PRIOR ART
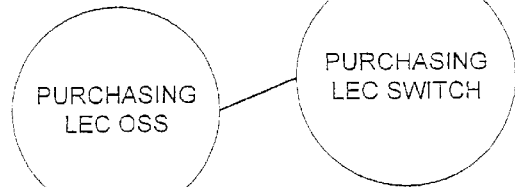
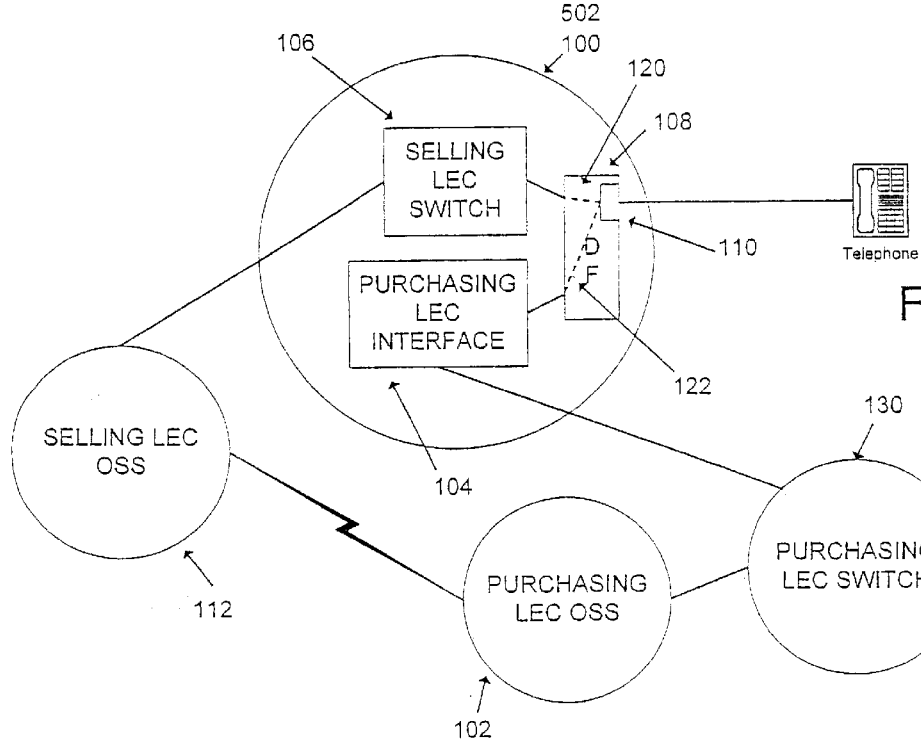
Fig. 4

US 6,567,513 B2

DRIVE AND METHOD FOR TRANSFERRING UNBUNDLED NETWORK ELEMENTS BETWEEN LOCAL EXCHANGE CARRIERS

CROSS REFERENCE TO RELATED APPLICATION

The present application is a continuation of pending U.S. patent application Ser. No. 09/056,769 filed on Apr. 8, 1998, entitled "Device and Method for Transferring Unbundled Network Elements Between Local Exchange Carriers" the disclosure of which is expressly incorporated herein by reference in its entirety.

BACKGROUND OF THE INVENTION

1. Field of the Invention

The present invention relates to a device and method for switching unbundled network elements (UNEs), and particularly the local loop, from one local exchange carrier (LEC) to another competing local exchange carrier. More particularly, the present invention relates to transferring local loops between different LECs without the need to schedule and/or coordinate the transfer.

2. Description of the Prior Art

A typical LEC arrangement is shown in FIG. 1. The LEC central office 500 has a switch 506 with terminating office equipment on the distribution frame (DF) 508. The connection typically includes (1) a direct connection between switch 506 and its appropriate connection in the office equipment (OE) side of DF 508, (2) a cross connect 520 passes through DF 508 (as shown by the dotted line) and connects to the cable and pair side of DF 508 at connection 510, and (3) a wire connects connection 510 of the cable and pair connector side of the DF 508 with a subscriber's telephone equipment. As known in the art, switch 506 does not communicate with the subscriber's telephone equipment unless cross connect 520 connects switch 506 with connector 510.

Current FCC regulations require LECs to lease UNEs to other competing LECs. To conform with these regulations, a selling LEC must permit a purchasing LEC to access DF 508 at selling LEC central office 500. Accordingly, as shown in FIG. 2, before transfer, a purchasing LEC sets up its own off-site switch 530, and a point of interface 504 at selling LEC central office 500. Purchasing LEC interface 504 has terminating office equipment on the OE side of DF 508; however, the cross connect 522 is "tied off", i.e., wire 522 is not physically connected to connector 510, such that purchasing LEC switch 530 cannot communicate with the subscriber's telephone equipment.

The above "tie-off" is due to the limitation that the local loop can only accommodate one switch at a time. Accordingly, to transfer service, a technician must physically disconnect cross connect 520 from connector 510 of DF 508 to disconnect the selling LEC, and physically connect cross connect 522 to connector 510 to connect purchasing LEC switch 530 (through interface 504).

Under FCC regulations, a subscriber's service can only be disconnected from a switch for a limited time. As a result, the purchasing LEC must set an appointment with the selling LEC for a frame attendant to reconnect the wires and transfer control of the local loop within that allocated time.

This process requires a frame attendant to travel to DF 508 and be present at the scheduled time. In theory, the purchasing LEC will communicate with the frame attendant to indicate readiness for transfer. The frame attendant then unplugs cross connect 520 to disconnect selling LEC switch 506 from the subscriber's telephone equipment, and plugs cross connect 522 in to connect purchasing LEC switch 530, as shown in FIG. 3. The purchasing LEC then does the necessary work and tests to confirm a proper connection. If complications prevent proper transfer within the allotted time, the frame attendant unplugs cross connect 522 to disconnect purchasing LEC switch 530 and re-plugs cross connect 520 in to reconnect selling LEC switch 506 (essentially returning the system to the orientation shown in FIG. 2). The purchasing LEC must then make another appointment to attempt transfer, and attempt to fix the problem before that time.

As seen by the above, transfer between LECs is based on the availability of the frame attendant, as the frame attendant must be physically present at the DF during the entire transfer period. This requires considerable coordination between the frame attendant and the purchasing LEC, plus labor expenses for the frame attendant's time.

SUMMARY OF THE INVENTION

It is accordingly an object of the present invention to overcome the drawbacks of the prior art.

It is accordingly a further object of the invention to transfer control of a local loop between LEC's without requiring the presence of, or incurring the expense associated with, a frame attendant.

It is accordingly a further object of the invention to provide the purchasing LEC with greater control over the transfer of service.

According to an embodiment of the invention, there is provided a method for transferring service from a first local exchange carrier to a second local exchange carrier. The first local exchange carrier connects to a distribution frame through a first switch, and the first switch is controlled by a control system. An interface is placed in proximity to the distribution frame. The second local exchange carrier is connected to the interface through a second switch. A connection from the first switch is overlapped to the distribution frame with the interface. The second local exchange carrier requests the control system to disconnect the first switch to thereby disconnect the first local exchange carrier from the distribution frame. The second local exchange carrier connects the interface to thereby connect the second local exchange carrier to the distribution frame.

According to a feature of the above embodiment, the second local exchange carrier confirms that the interface and second switch are properly connected with the distribution frame and subscriber's equipment attached thereto.

According to another feature of the above embodiment, the second local exchange carrier requests the control system to reconnect the first switch to the distribution frame in response to failure during confirmation of at least one of the interface and second switch to properly connect with the distribution frame.

According to yet another feature of the above embodiment, the request includes the second local exchange carrier providing at least one code to the control system, including at least an authorization code, checking whether the first switch and the distribution frame are connected; and disconnecting the first switch when the checking indicates that the first switch is connected to the distribution frame.

According to still another feature of the above embodiment, the connection between the first switch and the distribution frame is removed.

According to another embodiment of the invention, there is provided a method for transferring service of a distribution frame from a first switch of a first local exchange carrier to a second switch of a second local exchange carrier, where connections from the first switch, and an interface connected to the second switch, overlap into a common jack of the distribution frame. The second local exchange carrier contacts a control system which controls the first switch. The control system requests at least one code. The second local exchange carrier provides the at least one code. The control system checks the at least one code and permits further operations if the at least one code is valid. The control system checks to determine a status of the first switch. The control system disconnects the first switch if the first switch is connected to the distribution frame, whereupon the second local exchange carrier connects the interface to the distribution frame. The control system connects the first switch to the distribution frame if the first switch is disconnected from the distribution frame.

According to a feature of the above embodiment, connections between the first switch and at least the common jack are removed.

According to another feature of the above embodiment, if the first switch is disconnected, the second local exchange carrier disconnects at least one of the interface and the second switch before the control system connects the first switch.

According to yet another embodiment of the invention, a system for transferring service between first and second local exchange carriers is provided, and includes a distribution frame. A first switch is connected to the first local exchange carrier and a second switch is connected to the second local exchange carrier. The first switch is connected to a common connector of the distribution frame, and the second switch is connected to the common connector through an interface. A control mechanism controls the first switch, and includes a mechanism for one of disconnecting and connecting the first switch in response to a request from the second local exchange carrier. The second local exchange carrier includes a connecting mechanism which connects the second switch to the distribution frame through the interface in response to the first switch being disconnected, and which disconnects at least one of the interface and the second switch before the control means connects the first switch.

According to a feature of the above embodiment, the control mechanism includes a mechanism which receives an authorization code from the second local exchange carrier to permit the second local exchange carrier access to the mechanism for one of disconnecting and connecting.

According to a feature of each of the above embodiments, the control mechanism/system includes an interactive voice response system to interface with the second local exchange carrier.

BRIEF DESCRIPTION OF THE DRAWINGS

The present invention is further described in the detailed description which follows, in reference to the noted plurality of drawings by way of non-limiting examples of preferred embodiments of the present invention, in which like reference numerals represent similar parts through the several views of the drawings.

FIG. 3 is a schematic diagram of the connections of FIG. 2 after service is transferred;

FIG. 4 is a schematic diagram of a preferred embodiment of the invention;

DETAILED DESCRIPTION OF THE PREFERRED EMBODIMENTS

Figure 1:
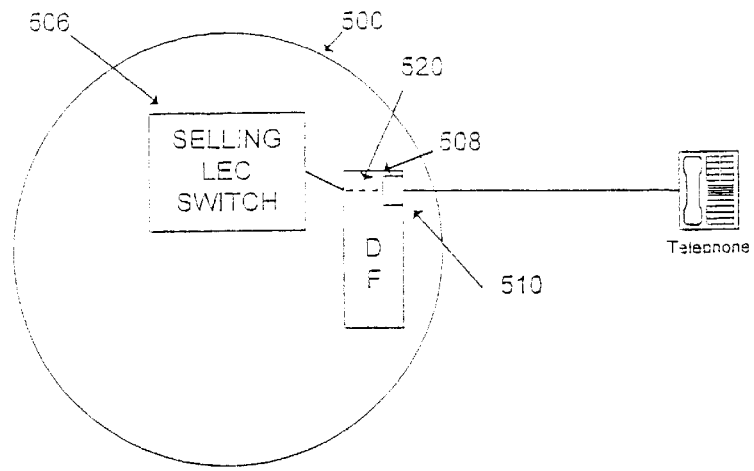
FIG. 1 is a schematic diagram of a local loop at a selling LEC's central office.
Figure 2:
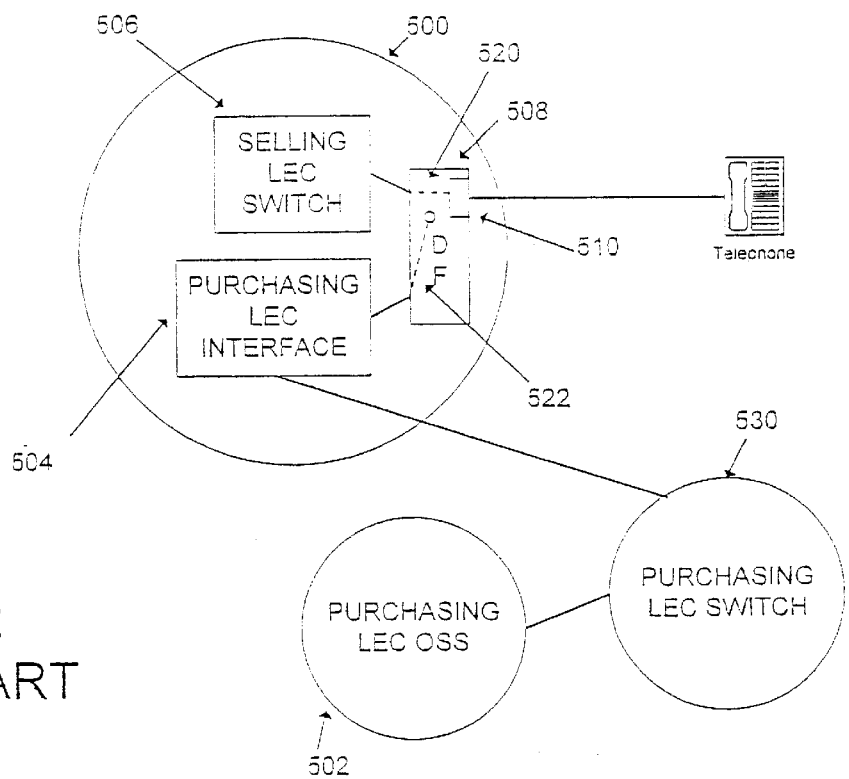
FIG. 2 is a schematic diagram of the connections set up by a purchasing LEC before transfer of service.

A schematic diagram of the configuration of the system to effect LEC transfer according to the present invention is shown in FIG. 4. As shown therein, a purchasing LEC installs a remote purchasing LEC switch 130, and a purchasing LEC interface 104 at a selling LEC central office 100. Switch 130 is connected to the purchasing LEC operation system station (OSS) 102. Following installation, a frame attendant for the selling LEC "half-taps" the purchasing LEC interface 104 with the connection from a selling LEC switch 106 into the same connector jack 110 of the cable and pair side of an DF 108, i.e., cross connects 120 and 122 from both selling LEC switch 106 and purchasing LEC interface 104 overlap and connect with the same terminals of jack 110. In the alternative, the purchasing LEC can "half-tap" cross connects 120 and 122 during the initial installation of interface 104.

Before transfer, purchasing LEC switch 130 (and/or interface 104) is inactive. Thus, although both switch 106 and interface 104 physically connect to the same terminals of jack 110, the subscriber's telephone equipment only remains in active communication with selling LEC switch 106.

When the purchasing LEC OSS 102 is ready to commence transfer, it contacts a selling LEC OSS 112, which controls selling LEC switch 106, over an appropriate medium (e.g., telephone, direct connection, Internet, intranet, etc.) to issue an appropriate deactivation request. Selling LEC OSS 112 responds by disconnected selling LEC switch 106 from DF 108 (e.g., turning selling LEC switch 106 OFF, disabling a communication relay, etc.).

The purchasing LEC then issues an appropriate activation command to connect purchasing LEC switch 130 (e.g., turn switch 130 or interface 104 ON, activate an appropriate relay, etc.). Staff at the purchasing LEC then initiate the necessary work and tests to confirm a proper connection with DF 108 and the subscriber's telephone equipment.

If complications prevent the purchasing LEC from establishing a proper connection within the allocated time period, then purchasing LEC disconnects purchasing LEC switch 130 and/or purchasing interface 104, and requests selling LEC OSS 112 to reconnect selling LEC switch 106. Purchasing LEC can then attempt to correct the problem and reestablish a proper connection at its convenience.

Once the connection is established, the "dead" connections between selling LEC switch 106 and DF 108 can be removed by a frame attendant at his convenience.

As can be seen by the above, the purchasing LEC can connect with DF 108 of a selling LEC without the presence of a frame attendant. By placing the purchasing LEC in total control of the transfer of service, the need for coordinating phone calls and/or to schedule personnel is eliminated. Since the frame attendant can make any necessary connections and/or remove wires collaterally with other services at DF 108, the costs associated with this specialized service of the frame attendant are eliminated. Further, the purchasing LEC does not need to continually schedule transfer times to try to overcome complications in previous attempts to establish a proper connection. Thus, not only does the transfer process take less time, the costs associated with the frame attendant are substantially reduced.

Figure 5:
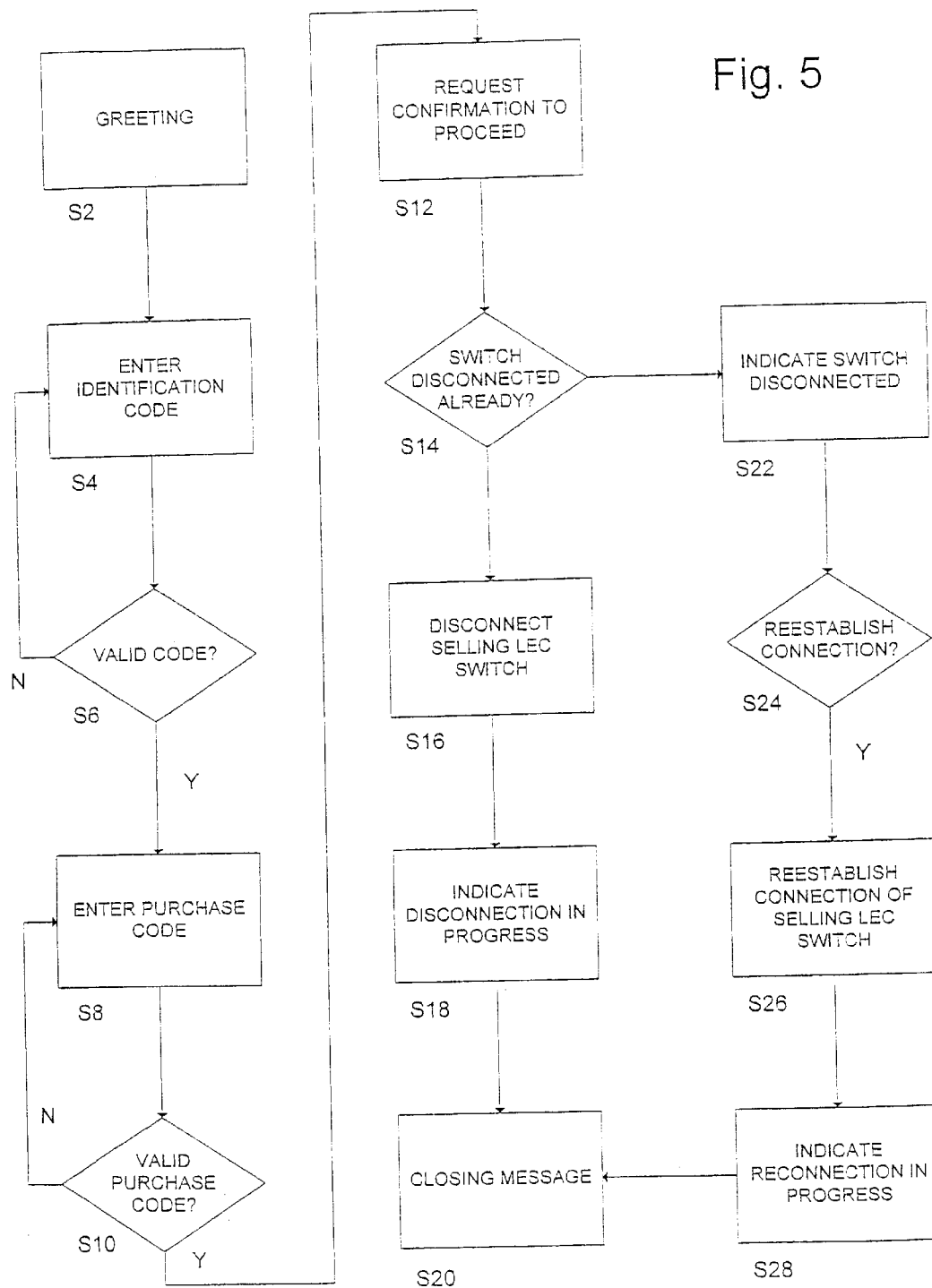
FIG. 5 is a flowchart of the preferred call flow diagram to transfer service between LECs.

Although many ways exist for purchasing LEC OSS 102 to communicate with selling LEC OSS 112, a preferred interactive voice response system with a graphical user interface set up by the selling LEC is shown in FIG. 5. At step S2, the system provides a greeting to confirm that the purchasing LEC has connected with selling LEC OSS 112. The system then requests entry of an identification code at step S4, which is checked at step S6. If the code is invalid, then control returns to step S4 to request a different code. If desired, the system may provide an "incorrect access code" message, and/or cut the user off if a correct code is not entered within a certain number of attempts.

If the code is valid, then the system requests a purchase code, which corresponds to the particular transfer and/or time for transfer, at step S8. The code is checked at step S10. If the code is invalid, then control returns to step S8 to request a different code. If desired, the system may provide an "incorrect purchasing code" message, and/or cut the user off if a correct code is not entered within a certain number of attempts.

If the purchase code is accurate, then the system requests confirmation to proceed at step S12. This is primarily a customer service break, in that it provides a convenient step for the purchasing LEC to obtain information about the subscribers that the service transfer will affect, or to abort the process. If the purchasing LEC elects to proceed with the transfer, then control passes to step S14 to determine whether selling LEC switch 106 is connected or disconnected to DF 108.

If connected, then selling LEC OSS 112 initiates the necessary procedures to disconnect selling LEC switch 106 at step S16. The system provides a message saying that disconnection is in progress (or complete) at step S18. A closing "thank you" message is provided at step S20.

If disconnected (typically only if the purchasing LEC previously disconnected the switch), then the system indicates that the switch is disconnected at step S22, and requests authorization to reconnect the switch at step 24. If reconnection is authorized, selling LEC OSS 112 then initiates the necessary procedures to reconnect selling LEC switch 106 at step S26. The system provides a message saying that re-connection is in progress (or complete) at step S28, followed by the closing message at step S20.

Although not detailed herein, each of the above steps may provide additional customer service options, including returning to a main menu or requesting to speak to a customer service representative.

By proceeding through the above steps S2–S20, a purchasing LEC can transfer service with minimal interaction with employees of the selling LEC and/or with a frame attendant. If the transfer is initially unsuccessful, then the purchasing LEC OSS 102 can relink with the selling LEC OSS 112 to execute steps S2–S14 and S22–S28 to return control to the selling LEC until the problem is corrected, again with minimal interaction with employees of the selling LEC and/or a frame attendant.

Figure 6:
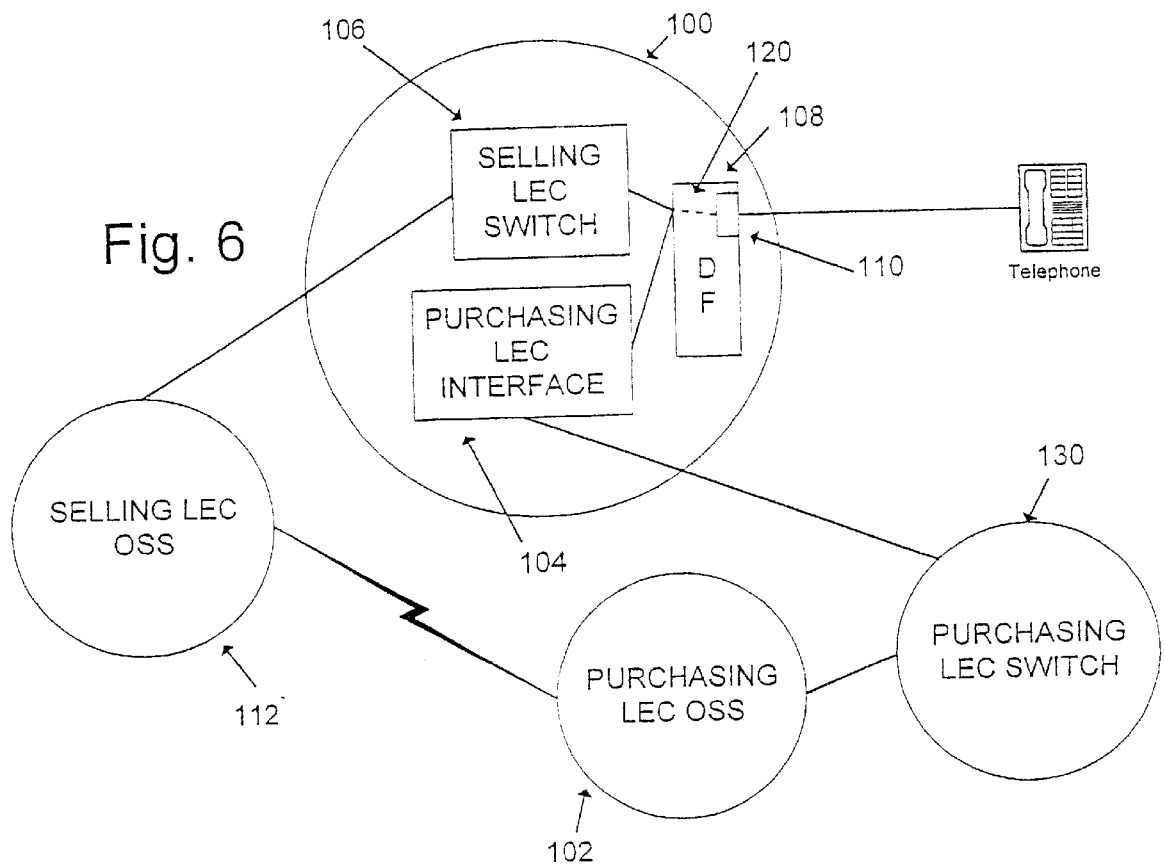
FIG. 6 is a schematic diagram of another embodiment of the invention.

In the above embodiment, the half-tap is positioned through cross connects 120 and 122 to connection jack 110 on the cable and pair side of DF 108. However, other orientations of the half-tap upstream from connection jack 110 are possible. For example, as shown in FIG. 6, the wires can overlap at the office equipment DF 108, thus only requiring a single wire on the cable and pair side.

While the invention has been described with reference to several exemplary embodiments, it is understood that the words which have been used herein are words of description and illustration, rather than words of limitations. Changes may be made, within the purview of the pending claims, without effecting the scope and spirit of the invention and its aspects. While the invention has been described here with reference to particular means, materials and embodiments, the invention is not intended to be limited to the particular disclosed herein; rather, the invention extends to all functionally equivalent structures, methods and uses, such at all within the scope of the appended claims.

By way of non-limiting example, a purchasing LEC can stay connected with the selling LEC at step S18 until transfer is confirmed; if a proper connection cannot be established, then the purchasing LEC can return to steps S4 or S8 to initiate a re-connection procedure. Similarly, a purchasing LEC can stay connected with the selling LEC OSS 112 at step S26 until any complications are overcome, and then return to steps S4 or S8 to restart the transfer.

Further, modifications to the above protocols, and the software/hardware for carrying out the same, are well within the skill in the art and fall within the scope and spirit of the present invention.

Still further, the automated protocol of the preferred embodiment is interactive voice response, in which the system provides audio messages to the second local exchange carrier and information (e.g., codes, option selection) is entered by telephone keypad. However, the system may also be computer based, in which the messages and/or options are displayed on a monitor and information is entered through an computer peripheral, e.g., keyboard and/or mouse.

What is claimed:

1. A method for transferring service from a first local exchange carrier to a purchasing local exchange carrier, the first local exchange carrier connecting to a first side of a distribution frame through a first switch that is controlled by a control system, the method comprising:
   connecting an interface of the purchasing local exchange carrier to the first side of the distribution frame, the interface also being connected to a purchasing local exchange carrier switch, the connection between the interface and the distribution frame physically overlapping with the connection between the first switch and the first side of the distribution frame;
   receiving a request to disconnect the first switch from the distribution frame; and
   disconnecting the first switch from the first side of the distribution frame, thus disconnecting the first local exchange carrier from the distribution frame.

2. The method of claim 1, further comprising removing the connection between the first switch and the first side of the distribution frame.

3. The method of claim 1, further comprising receiving a request to reconnect the first switch to the distribution frame in response to failure to receive confirmation that the interface and the second switch are properly connected with the distribution frame.

4. The method of claim 1, wherein the receiving further comprises:
   receiving at least one code at the control system, including at least an authorization code;
   checking whether the first switch and the distribution frame are connected; and the disconnecting further comprises disconnecting the first switch when the checking indicates that the first switch is connected to the distribution frame.

5. The method of claim 1, wherein the connection from the interface and the connection from the first switch further comprise connecting with the same terminals of a jack.

6. The method of claim 5, wherein the connection from the interface and the connection from the first switch further comprise a first cross connect from the first switch and a second cross connect from the interface, the first and second cross connects overlapping and connecting with the same terminal of the jack.

7. The method of claim 5, wherein the first side of the distribution further comprises the office equipment side of the distribution frame, wherein only a single wire is required at a cable and pair side of the distribution frame.

8. The method of claim 5, wherein the first side of the distribution further comprises the cable and pair side of the distribution frame.

9. A method for transferring service of a distribution frame from a first switch of a first local exchange carrier to a second switch of a purchasing local exchange carrier, where connections from the first switch, and an interface connected to said second switch, are physically overlapped into a common jack of said distribution frame, comprising:

receiving contact at a control system that controls the first switch;

the control system requesting at least one code;

receiving the at least one code;

the control system checking the at least one code and permitting further operations when the at least one code is valid;

the control system checking to determine a status of the first switch;

the control system disconnecting the first switch from the common jack if the first switch is connected to the common jack of the distribution frame; and the control system connecting the first switch to the common jack of the distribution frame when the first switch is disconnected from the common jack of the distribution frame.

10. The method of claim 9, further comprising removing connections between the first switch and at least said common jack.

11. The method of claim 9, wherein when the first switch is disconnected, the purchasing local exchange carrier disconnects at least one of the interface and the second switch before said control system connects the first switch.

12. A system for transferring service between first and second local exchange carriers, comprising:

a distribution frame having a cable and pair side and an office equipment side, the distribution frame being connected to a second switch that is connected to the second local exchange carrier;

a first switch connected to the first local exchange carrier, the first switch being connected to a common connector of the distribution frame, said second switch being connected to the common connector through an interface; and a controller that controls the first switch and disconnects and connects the first switch from the distribution frame in response to a request from the second local exchange carrier.

13. The system of claim 12, wherein the controller further comprises a receiver that receives an authorization code from the second local exchange carrier to permit said second local exchange carrier access to disconnect and connect the first switch from the distribution frame.

14. The system of claim 12, wherein said controller includes an interactive voice response system to interface with said second local exchange carrier.

15. The system of claim 12, in which the common connecter is on the office equipment side of the distribution frame.

16. The system of claim 12, in which the common connecter is on the cable and pair side of the distribution frame.

17. The method of claim 1, in which the control system utilizes an interactive voice response system to interface with the second local exchange carrier.

18. The method of claim 9, in which the control system utilizes an interactive voice response system to interface with the second local exchange carrier.

* * * * *